United States Patent
Kondo

(10) Patent No.: US 7,343,689 B2
(45) Date of Patent: Mar. 18, 2008

(54) SHEET THICKNESS DETECTION DEVICE, SHEET CONVEYING DEVICE, IMAGE FORMING APPARATUS

(75) Inventor: Hirofumi Kondo, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 31 days.

(21) Appl. No.: 11/401,176

(22) Filed: Apr. 10, 2006

(65) Prior Publication Data

US 2007/0234582 A1    Oct. 11, 2007

(51) Int. Cl.
*G01B 11/06* (2006.01)
(52) U.S. Cl. .................. 33/501.04; 33/501.02
(58) Field of Classification Search ............. 33/501.04, 33/501.02, 501.03
See application file for complete search history.

(56) References Cited

U.S. PATENT DOCUMENTS

| 1,133,300 | A | * | 3/1915 | McGauley | 33/501.04 |
| 2,848,816 | A | * | 8/1958 | O'Neill | 33/501.04 |
| 3,892,043 | A | * | 7/1975 | Bonikowski | 33/501.04 |
| 4,107,847 | A | * | 8/1978 | Typpo et al. | 33/501.02 |
| 4,941,269 | A | * | 7/1990 | Mori et al. | 33/783 |

FOREIGN PATENT DOCUMENTS

| JP | 06-016282 | 1/1994 |
| JP | 2001-199593 | 7/2001 |
| JP | 2003-112840 | 4/2003 |

* cited by examiner

*Primary Examiner*—Christopher W Fulton
(74) *Attorney, Agent, or Firm*—Amin, Turocy & Calvin, LLP

(57) ABSTRACT

A low-cost sheet thickness detection device has high sheet follow-up capability, has no influence on the conveyance of a sheet of paper, receives no influence of vibration and the like when mounted in a central position of the sheet in the width direction thereof, and allows complicated operations to be avoided when the conveying path is to be opened, and provides a sheet conveying device and an image forming apparatus. The sheet thickness detection device is provided in a sheet conveying path formed by a pair of conveyance guides opposite to each other to detect the thickness of a sheet conveyed in the sheet conveying path. It includes a pair of levers which are mounted on the pair of conveyance guides, respectively, and each of which is swingably pivoted at one end thereof to allow opening and closing motions of another end thereof about the end serving as a base point.

19 Claims, 5 Drawing Sheets

SHEET CONVEYING DIRECTION

SHEET THICKNESS DETECTION DEVICE, SHEET CONVEYING DEVICE, IMAGE FORMING APPARATUS

BACKGROUND OF THE INVENTION

1. Field of the Invention

The present invention relates to a sheet thickness detection device disposed in a sheet conveying path for detecting the thickness of a sheet of paper and a sheet conveying device and an image forming apparatus having the same.

2. Description of the Related Art

Sheet thickness detection devices for detecting the thickness of a sheet of paper as described below have been available according to the related art.

As shown in FIG. 5, there is a sheet thickness detecting sensor 108 for detecting the thickness of a sheet by detecting the amount of a movement of a movable core 100 moving in accordance with the thickness of the sheet from a magnetic change. The movable core 100 is provided at one end of a rotatable lever 104 which is urged against a guiding upper guide 102 for guiding the sheet at another end thereof, and the movable core 100 moves in accordance with a displacement of the lever 104 at a time when the sheet passes through a gap between the guiding upper guide 102 and the lever 104 (JP-A-2001-199593).

According to this technique, one surface of a sheet is in contact with the detection lever 104, and the other surface of the sheet faces a surface of the guiding guide 102. As a result, for example, when the sheet has high rigidity and curls up, a gap is generated between the sheet surface and the surface of the guiding guide 102, and the thickness of the sheet may be overestimated.

Another detector detects thickness of a sheet of paper using an optical reflection type displacement sensor (JP-A-2003-112840).

However, since a sheet of paper has a thickness of about 0.05 to 0.3 mm, it has been necessary to use an expensive sensor for accurate detection.

SUMMARY OF THE INVENTION

It is an object of an embodiment of the invention to provide a low-cost sheet thickness detection device capable of detecting the thickness of a sheet accurately, a sheet conveying device having the sheet thickness detection device, and an image forming apparatus.

In order to solve the above-described problem, a sheet thickness detection device according to the invention is a sheet thickness detection device which is provided in a sheet conveying path formed by a pair of conveyance guides opposite to each other and which detects the thickness of a sheet conveyed in the sheet conveying path. The detector comprises a pair of levers which are mounted on the pair of conveyance guides, respectively, and each of which is swingably pivoted at one end thereof to allow opening and closing motions of another end thereof about the end serving as a base point, the levers being disposed to allow a sheet to be inserted in a gap between the levers by the opening motion of the lever and a swing amount detection unit provided at the other end of the lever for detecting the thickness of the sheet by detecting the amount of the swing of the levers when the sheet is inserted.

A sheet conveying device according to the invention comprises a sheet conveying path formed by first and second conveyance guides, first and second levers which are provided and rotatably held so as to sandwich the sheet conveying path, a sensor for detecting the distance between the first and second levers, and a pair of rollers for conveying a sheet of paper in the sheet conveying path. The conveying device has a configuration in which the first and second levers rotate in the direction of increasing the distance between them when the sheet passes through them.

An image forming apparatus according to the invention comprises an image formation unit for forming a toner image on a sheet of paper, a sheet conveying path formed by first and second conveyance guides, first and second levers which are provided and rotatably held so as to sandwich the sheet conveying path, a sensor for detecting the distance between the first and second levers, and a plurality of roller pairs for conveying the sheet to the image formation unit via the sheet conveying path. The apparatus has a configuration in which the first and second levers have a protrusion on each of surfaces where the first and second levers face each other; the protrusions are urged by an elastic member into contact with each other; and the sheet contacts the protrusions to rotate the first and second levers such that the distance between the first and second levers increases when the sheet passes through them.

DESCRIPTION OF THE EMBODIMENT

An embodiment of the invention will now be described with reference to the drawings.

Figure 1:
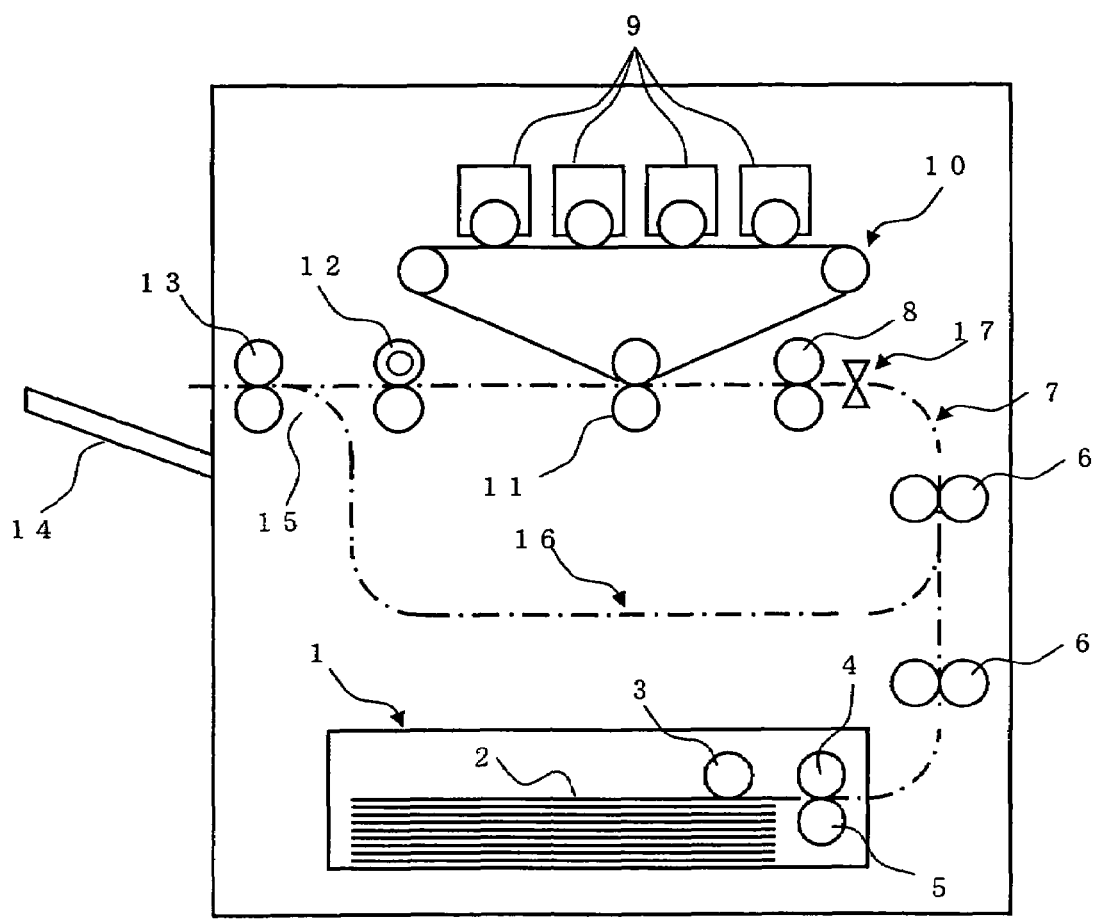
FIG. 1 is a schematic sectional view of an image forming apparatus having a sheet thickness detection device according to the invention mounted thereon.

FIG. 1 is a schematic sectional view of a sheet conveying device and an image forming apparatus having a sheet thickness detection device according to the invention.

A sheet tray 1 in which a plurality of sheets of paper 2 are contained one over another is removably mounted in a lower part of an image forming apparatus, and the sheets 2 in the sheet tray 1 are sent out by a pickup roller 3 provided in the sheet tray 1. The sheets 2 sent out are separated by a feed roller 4 and a reverse roller 5 into each individual sheet which is then conveyed by conveying rollers 6 in a sheet conveying path 7 and is temporarily stopped at a registration roller 8. Any skew of the sheet is corrected here, and the conveyance of the sheet 2 is thereafter resumed in accordance with the timing at which an image is generated on an intermediate transfer body 10 by four image generation units (image formation units) 9 (for yellow, magenta, cyan, and black) when a color image is to be formed. After the image is transferred onto the sheet 2 by a transfer roller 11, the sheet 2 is passed through a fixing device 12 to thermally fix the transferred image, and the sheet is discharged onto a discharge tray 14 by a discharge roller 13.

In the case of double-side printing, the sheet 2 is returned from a branching portion 15 provided downstream of the fixing device 12 to the sheet conveying path 7 via double-side conveying path 16. An image is then formed on the other side of the sheet 2, and the sheet is discharged onto the discharge tray 14.

As shown in FIG. 1, the sheet thickness detection device 17 according to the invention is mounted on the path for conveying the supplied sheet (sheet conveying path) 7 between the registration roller 8 and one pair of the conveying rollers 6 provided upstream of the same. There is no particular restriction on the mounting position of the sheet thickness detection device 17 as long as it resides on the sheet conveying path 7. However, in order to reflect a detection result in an image transfer or the like performed on the sheet of paper whose thickness has been actually detected, the detector is preferably provided as upstream as possible in the sheet conveying path 7, e.g., between the feed roller 4 and the conveying rollers 6 downstream of the same. At least either the feed roller 4 or the conveying rollers 6 corresponds to the roller pairs.

Figure 2:
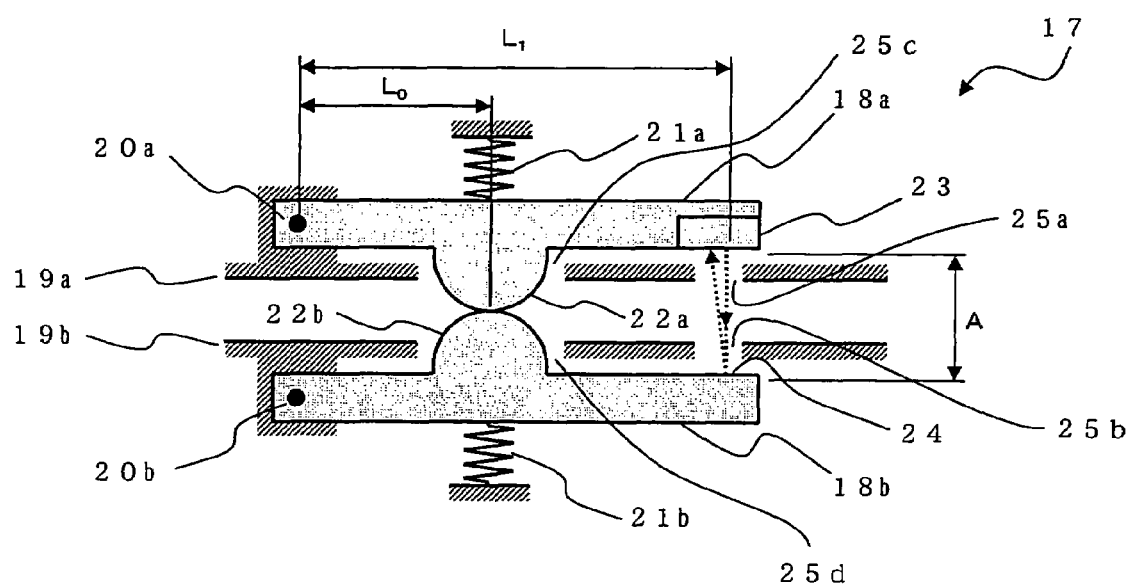
FIG. 2 is a sectional view showing the neighborhood of the sheet thickness detection device according to the invention.
Figure 3:
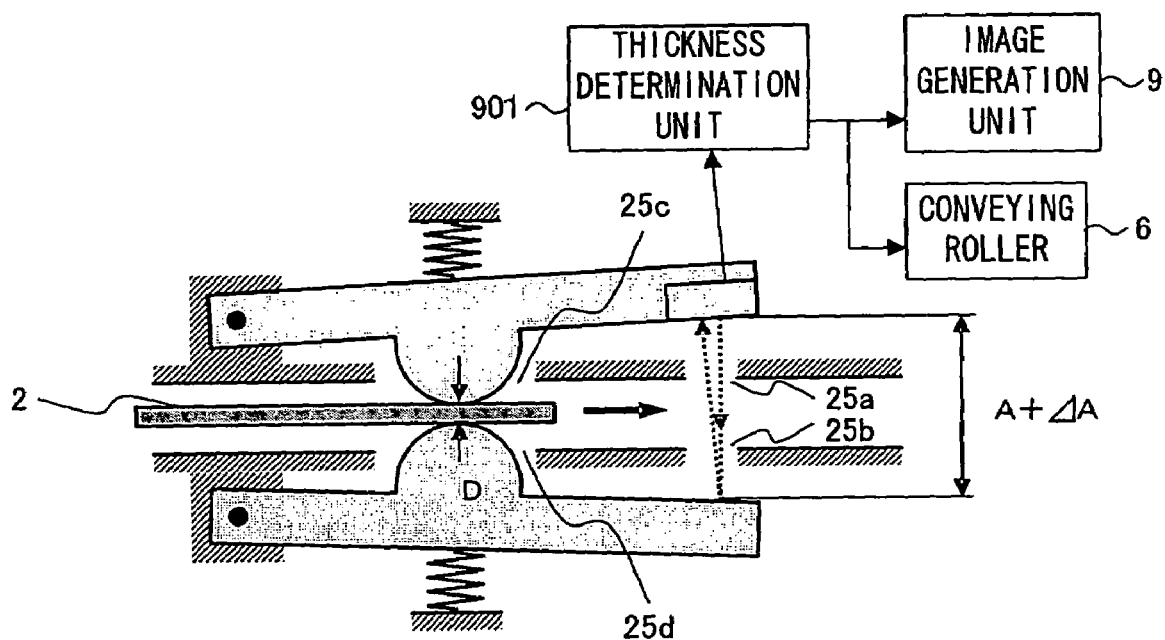
FIG. 3 is a sectional view of the sheet thickness detection device according to the invention taken when it detects the thickness of a sheet of paper.
Figure 4:
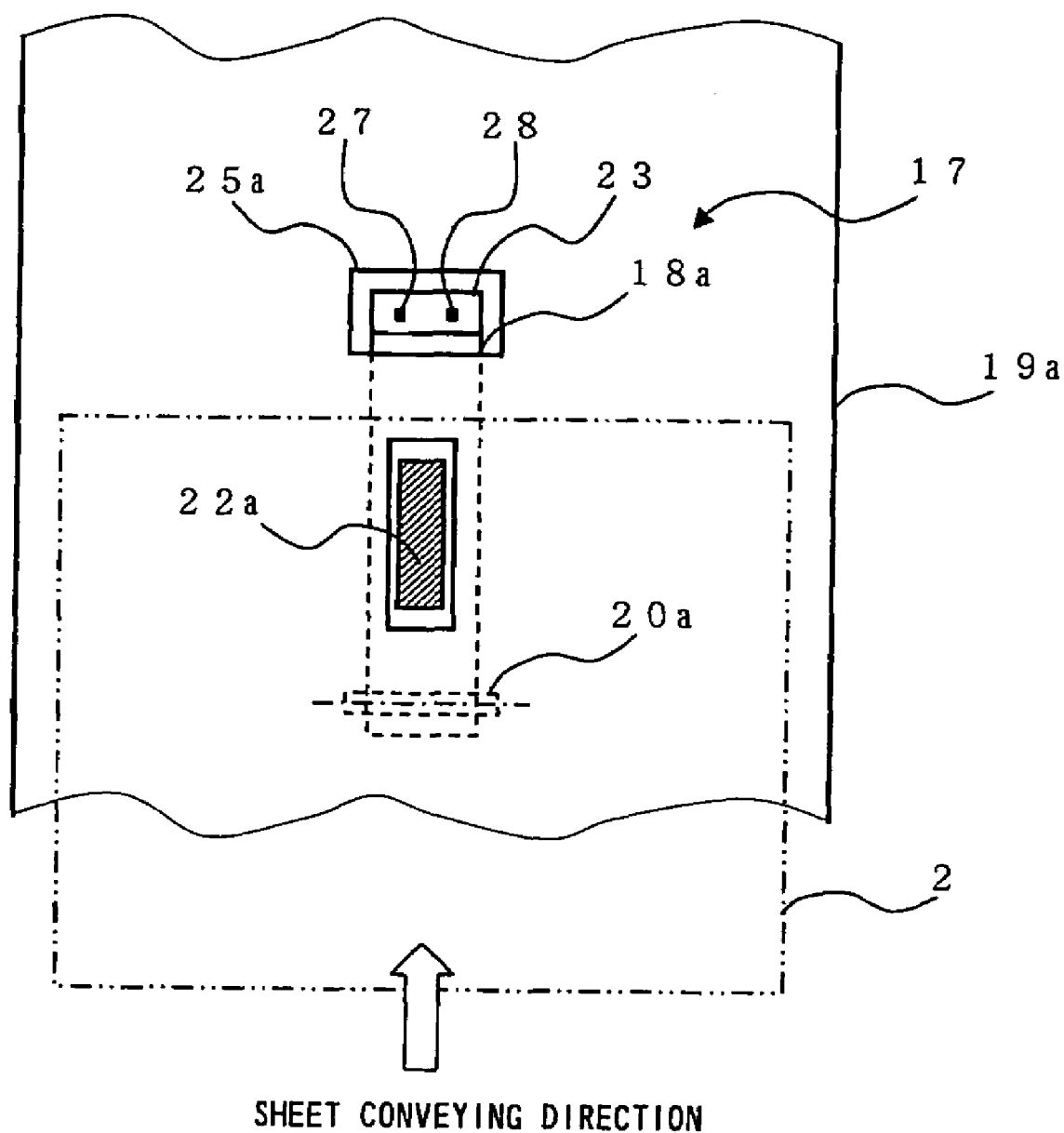
FIG. 4 is a view of the sheet thickness detection device detecting the thickness of a sheet of paper taken in the viewing direction from a conveyance guide toward one of levers.
Figure 5:
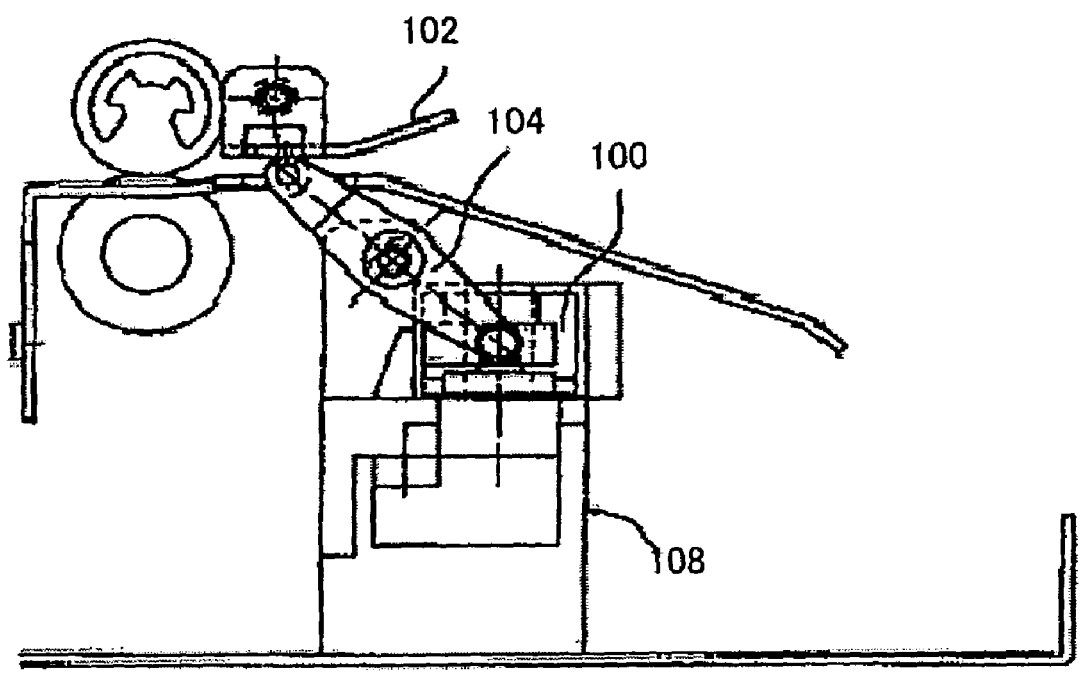
FIG. 5 is a sectional view showing an example of a sheet thickness detection device utilizing magnetism according to the related art.

The sheet thickness detection device 17 will now be described based on FIGS. 2, 3, and 4. FIG. 2 is a sectional view showing the sheet thickness detection device 17 of the present embodiment and the neighborhood thereof. FIG. 3 is a sectional view of the sheet thickness detection device 17 taken when it detects the thickness of a sheet of paper. FIG. 4 is a view of the sheet thickness detection device 17 detecting the thickness of a sheet of paper taken in the viewing direction from a conveyance guide 19a (a first conveyance guide) toward a lever 18a. Reference is made to an example in which the sheet conveying path 7 is horizontal and straight for convenience of description, but the example does not constitute any limitation.

FIG. 2 shows a state in which there is no sheet 2 in the sheet thickness detection device 17. A pair of levers 18a (a first lever) and 18b (a second lever) are swingably pivoted on the conveyance guides 19a and 19b (the second conveyance guide), respectively, at one end thereof with pivot shafts 20a and 20b (swing shafts), and they are disposed so as to sandwich the sheet conveying path. Contactors 22a and 22b, in the form of convex curved surfaces that can be put in contact with each other, are formed near the centers of surfaces of the pair of levers 18a and 18b facing each other, respectively (between the swing shafts and swing amount detecting portions of the pair of levers when viewed in the longitudinal direction thereof). At least the contactors 22a and 22b of the pair of levers 18a and 18b are formed from a low friction material such as plastic. The surface of the levers may be coated with a fluorine type resin. The resultant structure exhibits low friction against a sheet of paper 2 when the sheet 2 is inserted between the contactors 22a and 22b to detect the thickness of the sheet because the contactors 22a and 22b are formed from a low friction material and are in the form of convex curved surfaces which result in low insertion friction (they have a semi-circular sectional shape on a vertical plane substantially in parallel with the direction in which the sheet is conveyed).

Springs (elastic members) 21a and 21b are provided on back sides of the pair of levers 18a and 18b in the positions where the contactors 22a and 22b are formed, the springs being located on a straight line extending through the centers of the contactors 22a and 22b. Those springs 21a and 21b constantly impart a resilient force to the pair of levers 18a and 18b such that the contactors 22a and 22b contact each other with a predetermined urging force (in the direction of making them closer to each other). Although coil springs are used as the springs 21a and 21b in the present embodiment, the invention is not limited to them. Alternative parts may be used as long as they can impart a resilient force in the direction of making the levers 18a and 18b closer to each other. For example, a structure may be employed, in which torsion springs are provided on the shafts 20a and 20b.

An optical reflection type displacement sensor (which corresponds to the swing amount detection unit) 23 is mounted on the other end of the lever 18a of the pair of levers 18a and 18b, and a reflective surface 24 for reflecting light radiated by the optical reflection type displacement sensor 23 is formed on the other end of the other lever 18b. That is, the lever 18a has a structure in which the shaft 18a is provided on one end thereof and the reflection type displacement sensor 23 is provided on the other end thereof and in which the contactor 22a is disposed between them. The lever 18b is similar to the lever 18a in structure. As shown in FIG. 4, each of the optical reflection type displacement sensors 23 has a light-emitting portion 27 for radiating light toward the reflective surface 24 and a light-receiving portion 28 for receiving light reflected from the reflective surface 24. A signal detected at the optical reflection type displacement sensor 23 and the reflective surface 24 is sent to a thickness determination unit 901 that is shown in FIG. 3. The thickness determination unit 901 determines the thickness of a sheet which has passed through the sheet conveying path from the signal from the reflection type optical sensor. The thickness determination unit 901 is constituted by, for example, a CPU.

The conveyance guides 19a and 19b are formed with openings 25a and 25b, respectively, substantially in the middle thereof when viewed in the width direction. The light radiated from the optical reflection type displacement sensor 23 and the reflected light from the reflective surface 24 can pass through the openings 25a and 25b. Openings 25c and 25d are also formed on the conveyance guides 19a and 19b in positions different from the openings 25a and 25b and substantially in the middle of the guides when viewed in the width direction thereof. The contactors 22a and 22b protrude through the openings 25c and 25d.

Operations of the present embodiment will now be described based on FIGS. 3 and 4.

When a sheet 2 which has been conveyed in the sheet conveying path 7 is inserted between the contactors 22a and 22b, the gap between the contactors 22a and 22b is expanded by a dimension D that is the thickness of the sheet. Then, the levers 18a and 18b swing about the pivot shafts 20a and 20b serving as fulcrums, and the gap between the other ends of the levers 18a and 18b is expanded. That is, the levers 18a and 18b are disposed such that they are rotated in the directions of increasing the distance between them when a sheet passes between them. As a result, the distance from the light-emitting portion 27 and the light-receiving portion 28 of the optical reflection type displacement sensor 23 to the reflective surface 24 is increased, whereby the thickness of the sheet is detected.

The data detected by the optical reflection type sensor 23 is sent to an arithmetic unit, which is not shown, to be calculated using the expression described below. Specifically, let us assume that A represents the distance between the optical reflection type displacement sensor 23 and the reflective surface 24 when there is no sheet between the contactors 22a and 22b. Then, the distance between the optical reflection type displacement sensor 23 and the reflective surface 24 when a sheet 2 is inserted between the contactors 22a and 22b is represented by $A+\Delta A$. Let us now assume that the distance from the pivot shafts 20a and 20b to the contactors 22a and 22b is represented by $L_0$ and that the length from the pivot shafts 20a and 20b to the optical reflection type displacement sensor 23 along the conveying path is represented by $L_1$, as shown in FIG. 2. Then, the thickness dimension D of the sheet is calculated as $\Delta A \times (L_0/L_1)$.

Since the light from the optical reflection type displacement sensor 23 is blocked by the sheet 2 as the sheet 2 travels further, it can be observed that the sheet 2 has reached a point beyond the detectable range.

The sensor 23 may also serve as a sensor for detecting the presence of a sheet of paper in the conveying path.

Depending on the thickness of a sheet of paper determined as described above, for example, when the thickness is greater than a predetermined thickness, the thickness determination unit 901 may make a change such as a reduction in the processing speed to image forming conditions of the image formation process at the image generation units 9. Further, depending on the thickness of a sheet of paper determined as described above, for example, when the thickness is greater than a predetermined thickness, the thickness determination unit 901 may make a change such as a reduction in the sheet conveying speed of the conveying rollers 6 to sheet conveying conditions of the feed roller 4 and conveying rollers 6.

While the invention has been described in detail with reference to a specific mode of the same, it will be apparent to those skilled in the art that various changes and modification may be made as long as they do not depart from the sprit and scope of the invention.

As described in detail above, the invention makes it possible to provide a low-cost sheet thickness detection device which has high sheet follow-up capability, has no influence on the conveyance of a sheet of paper, receives no influence of vibration and the like when mounted in a central position of the sheet in the width direction thereof, and allows complicated operations to be avoided when the conveying path is to be opened, and to provide a sheet conveying device and an image forming apparatus.

What is claimed is:

1. A sheet thickness detection device which is provided in a sheet conveying path formed by a pair of conveyance guides opposite to each other and which detects the thickness of a sheet conveyed in said sheet conveying path, the sheet thickness detection device comprising:
   a pair of levers which are mounted on said pair of conveyance guides, respectively, and each of which is swingably pivoted at one end thereof to allow opening and closing motions of another end thereof about said end serving as a base point, the levers being disposed to allow a sheet to be inserted in a gap between said levers by the opening motion of said lever; and
   a swing amount detection unit provided at the other end of the lever for detecting the thickness of the sheet by detecting the amount of the swing of said levers when the sheet is inserted, the swing amount detection unit comprises an optical sensor, the optical sensor comprising a reflection type displacement sensor provided on one of surfaces of the pair of levers opposite to each other for projecting light on the other of the opposite surfaces and for receiving reflected light from the other of said opposite surfaces.

2. A sheet thickness detection device according to claim 1, wherein said pair of levers have contactors, which can be put into contact with each other, formed on those surfaces opposite to each other and an elastic member for constantly urging the pair of levers to press them against each other.

3. A sheet thickness detection device according to claim 2, wherein said contactors are in the form of convex curved surfaces.

4. A sheet thickness detection device according to claim 3, wherein said elastic member is a torsion spring provided on the swing shaft of the pair of levers.

5. A sheet thickness detection device according to claim 2, wherein said contactors are disposed between a swing shaft for swingably pivoting said levers and said swing amount detection unit in the longitudinal direction of the pair of levers.

6. A sheet conveying device comprising:
   a sheet conveying path formed by first and second conveyance guides;
   first and second levers which are provided and rotatably held so as to sandwich the sheet conveying path;
   a sensor configured to detect the distance between the first and second levers, the sensor is a reflection type optical sensor receiving reflected light which has been emitted by itself and reflected by said second lever; and
   a pair of rollers for conveying a sheet of paper in said sheet conveying path, wherein said first and second levers rotate in the direction of increasing the distance between them when the sheet passes through them.

7. A sheet conveying device according to claim 6, wherein said first lever and second lever each have a protrusion on a surface of said first lever and second lever opposite to each other.

8. A sheet conveying device according to claim 7, wherein said protrusion has a semi-circular sectional shape on a vertical plane substantially in parallel with the direction in which the sheet is conveyed.

9. A sheet conveying device according to claim 6, further comprising an elastic member configured to urge said first and second levers such that said first and second levers are made closer to each other.

10. A sheet conveying device according to claim 9, wherein said first lever and second lever each have a protrusion on a surface of said first lever and second lever opposite to each other and wherein the protrusions formed on said first and second lever are urged by said elastic member such that they contact each other.

11. A sheet conveying device according to claim 10, wherein said sensor is a reflection type optical sensor provided on one end of the first lever.

12. A sheet conveying device according to claim 10, having said sensor at one end of said first lever and a rotation shaft on another end thereof and having said protrusion between said sensor and said rotation shaft.

13. An image forming apparatus comprising:
   an image formation unit that forms a toner image on a sheet of paper;
   a sheet conveying path formed by first and second conveyance guides;
   first and second levers which are provided and rotatably held so as to sandwich the sheet conveying path;
   a sensor configured to detect the distance between the first and second levers, the sensor is a reflection type optical sensor receiving reflected light which has been emitted by itself and reflected by said second lever; and
   a plurality of roller pairs that conveys the sheet to said image formation unit via said sheet conveying path, wherein:
   said first and second levers have a protrusion on each of surfaces where said first and second levers face each other; said protrusions are urged by an elastic member into contact with each other; and the sheet contacts said protrusions to rotate said first and second levers such that the distance between said first and second levers increases when the sheet passes through them.

14. An image forming apparatus according to claim 13, having said sensor at one end of said first lever and a rotation shaft on another end thereof and having said protrusion between said sensor and said rotation shaft.

15. An image forming apparatus according to claim 13, comprising a thickness determination unit that determines the thickness of a sheet of paper which has passed through said sheet conveying path from a signal from said reflection type optical sensor.

16. An image forming apparatus according to claim 15, wherein the thickness determination unit changes image forming conditions at said image formation unit depending on the determined thickness of the sheet.

17. A method of detecting sheet thickness provided in a sheet conveying path, comprising:
  inserting a sheet in a gap between a pair of levers which are mounted on a pair of conveyance guides, respectively, by an opening motion of a lever, each lever is swingably pivoted at one end thereof to allow opening and closing motions of another end thereof about said end serving as a base point; and
  detecting the thickness of the sheet by projecting light from one lever to the other lever and receiving reflected light from the other lever thereby detecting the amount of swing of said levers when the sheet is inserted.

18. A method of detecting sheet thickness comprising:
  detecting a distance between the first and second levers provided and rotatably held so as to sandwich a sheet conveying path as a sheet passes between the first and second levers using a reflection type optical sensor receiving reflected light which has been emitted by itself and reflected by said second lever; and
  calculating the sheet thickness based upon the distance.

19. A method of detecting sheet thickness comprising:
  conveying a sheet through a sheet conveying path formed by first and second levers having a protrusion on each of their surfaces where said first and second levers face each other;
  increasing a distance between said first and second levers as the sheet passes therethrough;
  detecting a distance between the first and second levers using a reflection type optical sensor receiving reflected light which has been emitted by itself and reflected by said second lever; and
  calculating the sheet thickness based upon the distance.

* * * * *